(12) United States Patent
Rosenzweig et al.

(10) Patent No.: US 9,310,025 B2
(45) Date of Patent: Apr. 12, 2016

(54) HYDROGEN GENERATING FUEL CELL CARTRIDGES

(75) Inventors: Alain Rosenzweig, Saint Maur des Fossés (FR); Jean-Yves Laurent, Domene (FR); Frédéric Gaillard, Voiron (FR); Nathalie Giacometti, Claix (FR); Paul Adams, Monroe, CT (US)

(73) Assignees: Intelligent Energy Limited, Leicestershire (GB); Commissariat a L'energie Atomique, Paris (FR)

( * ) Notice: Subject to any disclaimer, the term of this patent is extended or adjusted under 35 U.S.C. 154(b) by 14 days.

(21) Appl. No.: 13/480,035

(22) Filed: May 24, 2012

(65) Prior Publication Data

US 2012/0230909 A1    Sep. 13, 2012

Related U.S. Application Data

(60) Continuation of application No. 12/783,145, filed on May 19, 2010, now abandoned, which is a division of application No. 11/066,573, filed on Feb. 25, 2005, now Pat. No. 7,727,293.

(51) Int. Cl.

| | |
|---|---|
| B01J 7/00 | (2006.01) |
| C01B 3/02 | (2006.01) |
| F17C 11/00 | (2006.01) |
| C01B 3/06 | (2006.01) |
| H01M 8/04 | (2006.01) |
| H01M 8/06 | (2006.01) |

(52) U.S. Cl.
CPC ............. *F17C 11/005* (2013.01); *C01B 3/065* (2013.01); *H01M 8/04208* (2013.01); *H01M 8/04216* (2013.01); *H01M 8/065* (2013.01); *Y02E 60/321* (2013.01); *Y02E 60/362* (2013.01); *Y02E 60/50* (2013.01)

(58) Field of Classification Search
USPC ....... 48/61, 197 R, 198.3; 422/236, 238, 608, 422/616, 617, 618
See application file for complete search history.

(56) References Cited

U.S. PATENT DOCUMENTS

| | | | |
|---|---|---|---|
| 3,447,286 A | 6/1969 | Dounoucos | |
| 4,699,637 A | 10/1987 | Iniotakis et al. | |
| 4,874,516 A * | 10/1989 | Kondo | ............ 210/490 |
| 5,364,977 A | 11/1994 | Asai et al. | |
| 5,945,231 A | 8/1999 | Narayanan et al. | |
| 5,992,008 A | 11/1999 | Kindler | |
| 5,997,594 A | 12/1999 | Edlund et al. | |
| 6,274,093 B1 * | 8/2001 | Long et al. | ..... 422/129 |
| 6,319,306 B1 | 11/2001 | Edlund et al. | |
| 6,458,189 B1 | 10/2002 | Edlund et al. | |
| 6,512,005 B2 | 1/2003 | Bercovici et al. | |
| 6,554,877 B2 | 4/2003 | Finkelshtain et al. | |
| 6,562,497 B2 | 5/2003 | Finkelshtain et al. | |
| 6,758,871 B2 | 7/2004 | Finkelshtain et al. | |
| 6,773,470 B2 | 8/2004 | Finkelshtain et al. | |

(Continued)

*Primary Examiner* — Kaity Handal
(74) *Attorney, Agent, or Firm* — The H.T. Than Law Group

(57) ABSTRACT

A gas-generating apparatus includes a cartridge including a reservoir having a first reactant and a reaction chamber, and a receiver that can include a flow control device. The receiver is adapted to receive the cartridge and to transport the first reactant to the reaction chamber after connection with the cartridge. The flow control device is adapted to stop the transport of reactant when the pressure in the reaction chamber reaches a predetermined pressure.

16 Claims, 1 Drawing Sheet

(56) References Cited

U.S. PATENT DOCUMENTS

| | | |
|---|---|---|
| 7,074,509 B2 | 7/2006 | Rosenfeld et al. |
| 7,147,955 B2 | 12/2006 | Adams |
| 7,329,470 B2 | 2/2008 | Adams et al. |
| 7,501,008 B2 | 3/2009 | Eshraghi et al. |
| 7,537,024 B2 | 5/2009 | Adams et al. |
| 7,674,540 B2 | 3/2010 | Adams et al. |
| 7,762,278 B2 | 7/2010 | Adams et al. |
| 7,784,621 B2 * | 8/2010 | Pinnau .................. 210/510.1 |
| 2002/0076602 A1 | 6/2002 | Finkelshtain et al. |
| 2002/0160245 A1 * | 10/2002 | Genc ............... H01M 8/04007 429/437 |
| 2002/0182459 A1 * | 12/2002 | Hockaday et al. ............. 429/19 |
| 2003/0077493 A1 | 4/2003 | Colborn et al. |
| 2003/0096150 A1 | 5/2003 | Rice et al. |
| 2003/0138679 A1 | 7/2003 | Prased et al. |
| 2003/0183080 A1 * | 10/2003 | Mundschau .................. 95/55 |
| 2004/0021507 A1 * | 2/2004 | Fischer .................. H03L 7/18 327/558 |
| 2005/0158595 A1 | 7/2005 | Marsh et al. |
| 2005/0164055 A1 * | 7/2005 | Hasegawa ......... H01M 8/04186 429/413 |
| 2006/0068487 A1 * | 3/2006 | Aizenberg et al. ......... 435/287.1 |

* cited by examiner

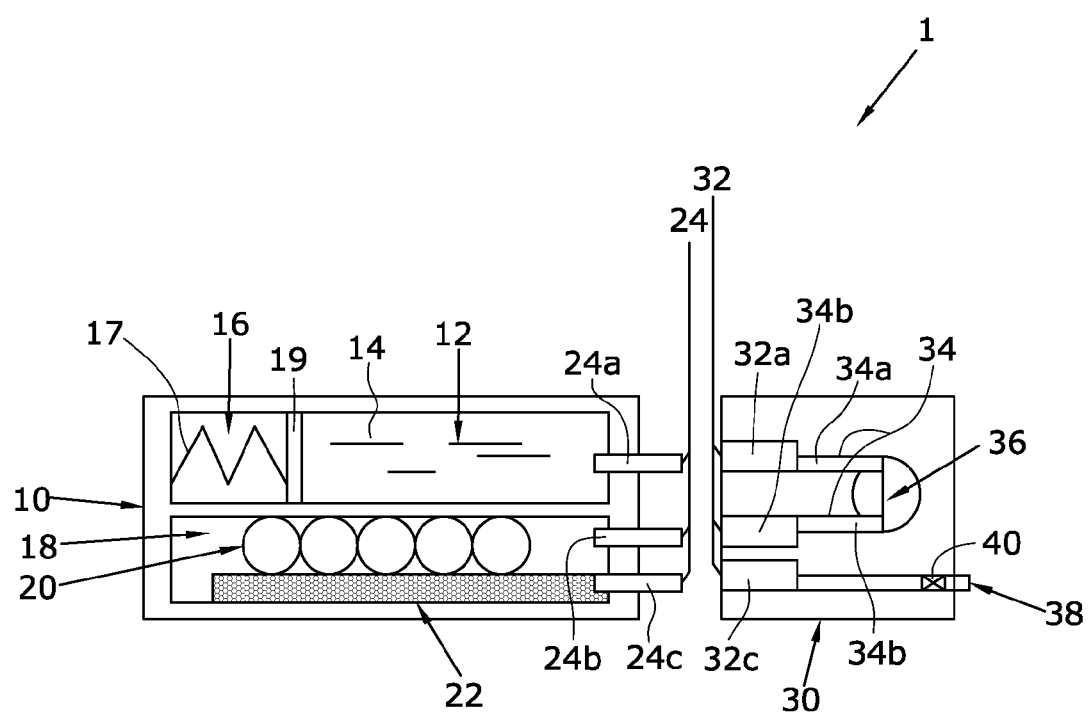

HYDROGEN GENERATING FUEL CELL CARTRIDGES

CROSS-REFERENCE TO RELATED APPLICATIONS

The present application is a continuation of U.S. patent application Ser. No. 12/783,145, which was filed on May 19, 2010, which is a divisional of U.S. patent application Ser. No. 11/066,573, which was filed on Feb. 25, 2005, and issued as U.S. Pat. No. 7,727,293 on Jun. 1, 2010. The '145 and '573 applications are incorporated by reference herein in its entirety.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel, as well as portable power storage, such as lithium-ion batteries.

In general, fuel cell technology includes a variety of different fuel cells, such as alkali fuel cells, polymer electrolyte fuel cells, phosphoric acid fuel cells, molten carbonate fuel cells, solid oxide fuel cells and enzyme fuel cells. Today's more important fuel cells can be divided into several general categories, namely: (i) fuel cells utilizing compressed hydrogen ($H_2$) as fuel; (ii) proton exchange membrane (PEM) fuel cells that use alcohols, e.g., methanol ($CH_3OH$), metal hydrides, e.g., sodium borohydride ($NaBH_4$), hydrocarbons, or other fuels reformed into hydrogen fuel; (iii) PEM fuel cells that can consume non-hydrogen fuel directly or direct oxidation fuel cells; and (iv) solid oxide fuel cells (SOFC) that directly convert hydrocarbon fuels to electricity at high temperature.

Compressed hydrogen is generally kept under high pressure and is therefore difficult to handle. Furthermore, large storage tanks are typically required and cannot be made sufficiently small for consumer electronic devices. Conventional reformat fuel cells require reformers and other vaporization and auxiliary systems to convert fuels to hydrogen to react with oxidant in the fuel cell. Recent advances make reformer or reformat fuel cells promising for consumer electronic devices. The most common direct oxidation fuel cells are direct methanol fuel cells or DMFC. Other direct oxidation fuel cells include direct ethanol fuel cells and direct tetramethyl orthocarbonate fuel cells. DMFC, in which methanol is reacted directly with oxidant in the fuel cell, is the simplest and potentially smallest fuel cell. It also has promising power application for consumer electronic devices. SOFC convert hydrocarbon fuels, such as butane, at high heat to produce electricity. SOFC requires relatively high temperature in the range of 1000° C. for the fuel cell reaction to occur.

The chemical reactions that produce electricity are different for each type of fuel cell. For DMFC, the chemical-electrical reaction at each electrode and the overall reaction for a direct methanol fuel cell are described as follows:

Half-reaction at the anode:

$$CH_3OH + H_2O \rightarrow CO_2 + 6H^+ + 6e^-$$

Half-reaction at the cathode:

$$1.5O_2 + 6H^+ + 6e^- \rightarrow 3H_2O$$

The overall fuel cell reaction:

$$CH_3OH + 1.5O_2 \rightarrow CO_2 + 2H_2O$$

Due to both the migration of the hydrogen ions ($H^+$) through the PEM from the anode to the cathode and the inability of the free electrons ($e^-$) to pass through the PEM, the electrons flow through an external circuit, thereby producing an electrical current. The external circuit may be used to power many useful consumer electronic devices, such as mobile or cell phones, calculators, personal digital assistants, laptop computers, and power tools, among others.

DMFC is discussed in U.S. Pat. Nos. 5,992,008 and 5,945,231, which are incorporated herein by reference in their entireties. Generally, the PEM is made from a polymer, such as Nafion® available from DuPont, which is a perfluorinated sulfonic acid polymer having a thickness in the range of about 0.05 mm to about 0.5 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

In another direct oxidation fuel cell, borohydride fuel cell (DBFC) reacts as follows:

Half-reaction at the anode:

$$BH_4^- + 8OH^- \rightarrow BO_2^- + 6H_2O + 8e^-$$

Half-reaction at the cathode:

$$2O_2 + 4H_2O + 8e^- \rightarrow 8OH^-$$

In a chemical metal hydride fuel cell, generally aqueous sodium borohydride is reformed and reacts as follows:

$$NaBH_4 + 2H_2O \rightarrow (\text{heat or catalyst}) \rightarrow 4(H_2) + (NaBO_2)$$

Half-reaction at the anode:

$$H_2 \rightarrow 2H^+ + 2e^-$$

Half-reaction at the cathode:

$$2(2H^+ + 2e^-) + O_2 \rightarrow 2H_2O$$

Suitable catalysts for this reaction include platinum and ruthenium, as well as other metals. The hydrogen fuel produced from reforming sodium borohydride is reacted in the fuel cell with an oxidant, such as $O_2$, to create electricity (or a flow of electrons) and water byproduct. A sodium borate ($NaBO_2$) byproduct is also produced by the reforming process. A sodium borohydride fuel cell is discussed in U.S. Pat. No. 4,261,956, which is incorporated herein by reference. Therefore, the known chemical hydride reactions that use aqueous metal hydride have about 9 to 12 weight percentage storage expectancy, and the liquid and the catalyst used in the wet chemical reaction system need to be closely monitored. Additionally, it is difficult to maintain the stability of a metal hydride solution over a long period of time, because according to the formula t1/2−pH*log(0.034+kT), which provides the half life of the reaction, the reaction of hydrolysis always occurs very slowly. Furthermore, if the solution is stabilized, the reactivity is not complete.

In a hydride storage method, the reaction is as follows:

$$\text{Metal} + H_2 \rightarrow \text{hydride} + \text{heat}$$

However, storage expectancy of such a reaction is only about 5 weight percentage. Additionally, such reactions can be expensive and difficult to package.

Another known method to produce hydrogen is a dry hydride reaction. Dry reaction, generally, involves the following reaction:

$$X(BH_4) \rightarrow H_2,$$

where X includes, but is not limited to, Na, Mg, Li, etc.

Again, dry reactions have several disadvantages, such as having a storage expectancy of only about 10 weight percentage, and the need to closely monitor the pressure.

An additional method to produce hydrogen gas is by a pressure storage method using the formula PV=nRT, wherein P is pressure, V is volume, n is a number of moles, R is the gas constant, and T is temperature. This method requires constant pressure monitoring.

One of the most important features for fuel cell application is fuel storage. Another important feature is regulating the transport of fuel out of the fuel cartridge to the fuel cell. To be commercially useful, fuel cells such as DMFC or PEM systems should have the capability of storing sufficient fuel to satisfy the consumers' normal usage. For example, for mobile or cell phones, for notebook computers, and for personal digital assistants (PDAs), fuel cells need to power these devices for at least as long as the current batteries and, preferably, much longer. Additionally, the fuel cells should have easily replaceable or refillable fuel tanks to minimize or obviate the need for lengthy recharges required by today's rechargeable batteries.

One common disadvantage of the known hydrogen gas generators is that once the reaction starts, the gas generator cartridge cannot control the reaction. Thus, the reaction will continue until the supply of the reactants run out or the source of the reactant is manually shut down. Moreover, the known hydrogen generators may not work when positioned in a certain orientation and are relatively large in size. Accordingly, there remains a need for improved hydrogen generators and the reactants producing hydrogen.

SUMMARY OF THE INVENTION

The present invention relates to a gas-generating apparatus that includes at least two separate portions. The first portion of the gas-generating apparatus contains at least a reaction chamber and a reactant reservoir. The second portion, which includes a receptacle, is adapted to receive the first portion. The second portion can be part of a fuel cell or a device that the fuel cell powers. The second portion includes at least one coupler and/or a flow control device that can be controlled by the pressure of the reaction chamber or the first portion. When the pressure in the reaction chamber is within a predetermined level, the flow control device closes to stop the transport of the first reactant to the reaction chamber. One advantage of the present invention is that when the first portion is separated from the second portion, the reactant cannot be mixed to react with each other.

The present invention also relates to a fuel usable with a gas-generating apparatus. The fuel includes a solid metal hydride and an aqueous solution having water, a catalyst, and/or at least one alcohol or a mixture of alcohols. One of the reactants may also include an acid to improve the reaction between the reactants over time.

The present invention also relates to a method for generating gas. It is to be understood that both the foregoing general description and the following detailed description are exemplary and explanatory only and are intended to provide a further explanation of the present invention, as claimed.

BRIEF DESCRIPTION OF THE DRAWINGS

In the accompanying drawing, which forms a part of the specification and is to be read in conjunction therewith and in which like reference numerals are used to indicate like parts in the various views:

FIG. 1 is a cross-sectional view of a gas-generating apparatus that is capable of supplying a desired gas to a micro fuel cell.

Throughout the specification, the terms "valve component" and "coupler" designated by numeral 24, "receptacle" and "receiver" designated by numeral 30 are used interchangeably.

DETAILED DESCRIPTION OF THE PREFERRED EMBODIMENTS

As illustrated in the accompanying drawing and discussed in detail below, the present invention is directed to a fuel supply, which stores fuel cell fuels, such as methanol and water, methanol/water mixture, methanol/water mixtures of varying concentrations, pure methanol, and/or methyl clathrates described in U.S. Pat. Nos. 5,364,977 and 6,512,005 B2, which are incorporated herein by reference in their entirety. Methanol or other alcohols are usable in many types of fuel cells, e.g., DMFC, enzyme fuel cells and reformat fuel cells, among others. The fuel supply may contain other types of fuel cell fuels, such as ethanol or alcohols; metal hydrides, such as sodium borohydrides; other chemicals that can be reformatted into hydrogen; or other chemicals that may improve the performance or efficiency of fuel cells. Fuels also include potassium hydroxide (KOH) electrolyte, which is usable with metal fuel cells or alkali fuel cells, and can be stored in fuel supplies. For metal fuel cells, fuel is in the form of fluid borne zinc particles immersed in a KOH electrolytic reaction solution, and the anodes within the cell cavities are particulate anodes formed of the zinc particles. KOH electrolytic solution is disclosed in U.S. published patent application no. 2003/0077493, entitled "Method of Using Fuel Cell System Configured to Provide Power to One or More Loads," published on Apr. 24, 2003, which is incorporated herein by reference in its entirety. Fuels can also include a mixture of methanol, hydrogen peroxide and sulfuric acid, which flows past a catalyst formed on silicon chips to create a fuel cell reaction. Moreover, fuels include a blend or mixture of methanol, sodium borohydride, an electrolyte, and other compounds, such as those described in U.S. Pat. Nos. 6,554,877; 6,562,497; and 6,758,871, which are incorporated by reference in their entireties. Furthermore, fuels include those compositions that are partially dissolved in a solvent and partially suspended in a solvent, described in U.S. Pat. No. 6,773,470 and those compositions that include both liquid fuel and solid fuels, described in U.S. published patent application no. 2002/0076602. These references are also incorporated by reference in their entireties.

Fuels can also include a metal hydride such as sodium borohydride ($NaBH_4$) and water, discussed above. Fuels can further include hydrocarbon fuels, which include, but are not limited to, butane, kerosene, alcohol, and natural gas, as set forth in United States published patent application no. 2003/0096150, entitled "Liquid Hereto-Interface Fuel Cell Device," published on May 22, 2003, which is incorporated herein by reference in its entirety. Fuels can also include liquid oxidants that react with fuels. The present invention is therefore not limited to any type of fuels, electrolytic solutions, oxidant solutions or liquids or solids contained in the supply or otherwise used by the fuel cell system. The term "fuel" as used herein includes all fuels that can be reacted in fuel cells or in the fuel supply, and includes, but is not limited to, all of the above suitable fuels, electrolytic solutions, oxidant solutions, gaseous, liquids, solids, and/or chemicals and mixtures thereof.

As used herein, the term "fuel supply" includes, but is not limited to, disposable cartridges, refillable/reusable cartridges, containers, cartridges that reside inside the electronic device, removable cartridges, cartridges that are outside of the electronic device, fuel tanks, fuel refilling tanks, other containers that store fuel and the tubings connected to the fuel tanks and containers. While a cartridge is described below in conjunction with the exemplary embodiments of the present invention, it is noted that these embodiments are also applicable to other fuel supplies and the present invention is not limited to any particular type of fuel supply.

The fuel supply of the present invention can also be used to store fuels that are not used in fuel cells. These applications can include, but are not limited to, storing hydrocarbons and hydrogen fuels for micro gas-turbine engine built on silicon chips, discussed in "Here Come the Microengines," published in The Industrial Physicist (December 2001/January 2002) at pp. 20-25. As used in the present application, the term "fuel cell" can also include microengines. Other applications can include storing traditional fuels for internal combustion engines and hydrocarbons, such as butane for pocket and utility lighters and liquid propane.

Suitable known hydrogen generating apparatus are disclosed in co-pending U.S. patent application Ser. Nos. 10/679,756 and 10/854,540. The disclosures of these references are incorporated herein by reference in their entireties.

In various embodiments of the present invention, the gas-generating apparatus of the present invention can function regardless of how it is positioned, e.g., sideway, diagonal, or upside-down. The gas-generating apparatus of the present invention, for a small device such as a mobile phone, has a volume of about 100 $cm^3$ or less, preferably about 70 $cm^3$ or less, or about 40 $cm^3$ or less, and includes a cartridge and a receptacle (or receiver). Preferably, the cartridge or a portion thereof is disposable and contains the reactive compositions. The receiver can include flow control device, conduits, pathways, or channels adapted to transport the reactive compositions in the cartridge to come in contact and react with one another. Preferably, the receiver is removably attachable from the cartridge. The reactive compositions in the cartridge cannot contact each other unless the cartridge has been connected to the receiver. The receiver can also direct the generated gas towards the fuel cell.

The cartridge includes a reservoir having a first reactant and a reaction chamber. The reaction chamber can include a second reactant. The first reactant can include water and the second reactant can include a metal hydride, e.g., sodium borohydride. The reactants can be in gaseous, liquid, or solid form. Preferably, the first reactant is water that can optionally include an additive and/or a catalyst. The second reactant is preferably a solid metal hydride or a solid metal borohydride. The solid reactants can be powder, pellets, porous structures, balls, tubes, soluble sheaths or can be deposited on the walls of the reaction chamber, among other forms. The reaction of water and metal hydride can produce hydrogen gas. Other suitable reactants or reagents are disclosed in U.S. patent application Ser. No. 10/854,540, which is previously incorporated herein. Additionally, the first reactant can be methanol or a hydrocarbon, such as butane, and the reaction chamber contains one or more catalyst or is capable of generating heat, and no reactant. The first reactant may be hydrolyzed in the presence of the catalyst(s) or heat in the reaction chamber.

The receiver or receptacle of the present invention is capable of transporting a first reactant from a reservoir in the cartridge to a reaction chamber in the cartridge. The pressure inside the reaction chamber can control the transport of the first reactant from the reservoir into the reaction chamber. For example, the first reactant in the reservoir can be introduced into the reaction chamber when the pressure inside the reaction chamber is less than a predetermined value, or alternatively, if the pressure inside the reaction chamber is less than the pressure in the reservoir by a predetermined amount. The flow of the first reactant from the reservoir into the reaction chamber is preferably self-regulated. Thus, when the reaction chamber reaches a predetermined pressure or above the pressure in the reservoir, the flow of the first reactant from the reservoir into the reaction chamber can be stopped to prevent further production of hydrogen gas. Similarly, when the pressure of the reaction chamber is reduced below the predetermined value or below the pressure in the reservoir by a predetermined amount, the first reactant again flows from the reservoir into the reaction chamber. The first reactant in the reservoir can be introduced into the reaction chamber by any known method including, but not limited to, pumping, osmosis, capillary action, pressure differential, valve, or one or more combinations thereof. Preferably, the reservoir is pressurized to provide the energy to transport the first reactant to the reaction chamber. The pressure in the reservoir is created by a pressure applicator, such as a spring, foam piston, propellant gas, liquefied hydrocarbon, and/or deformable flexible walls.

Cartridge 10 of the present invention includes reservoir 12, which contains first reactant 14 and reaction chamber 18, which contains optional second reactant 20. In one exemplary embodiment (not shown in FIG. 1), reservoir 12 can include a bladder or liner holding first reactant 14. When a bladder is used, the bladder can be made from any material, including flexible material or elastic material.

As illustrated in FIG. 1, gas-generating apparatus 1 includes a cartridge 10 and receiver 30. In one example, cartridge 10 and receiver 30 are removably connectable to one another by one or more couplers. For example, cartridge 10 can be removably connected to receiver 30 by three valve components 24 and three valve components 32. Suitable couplers 24 and 32 include, but are not limited to, car-sealing quick action couplers, check valves, duckbill valves, solenoid valves, needle and septum, electrical valves, and magnetic valves. Other suitable valves include those disclosed in U.S. patent application Ser. Nos. 10/629,006 and 10/978,949, which are incorporated by reference herein in their entireties. However, any known couplers to one skilled in the art can be used to connect cartridge 10 to receiver 30. Couplers 24 and 32 can also act as part of, or as extension of, conduits 34 and 38, which are used to transport first reactant 14 and the generated gas, respectively. When cartridge 10 is connected to receiver 30, couplers 24a, 24b, and 24c extend from cartridge 10 and are connected to corresponding couplers 32a, 32b, and 32c, respectively. As shown, first reactant 14 is transportable from reservoir 12 through couplers 24a, 32a through conduit 34a and valve 36 and is then returnable to reaction chamber 18 of cartridge 10 through conduit 34b and couplers 32b, 24b. Each coupler or valve component 24, 32, preferably has internal seal to prevent reactants from leaking when cartridge 10 is separated from receptacle 30. An advantage of the present invention is that the first and second reactants do not contact each other until cartridge 10 is inserted into receiver 30.

Reservoir 12 is preferably pressurized, for example, by a pressure applicator 16 capable of applying a predetermined amount of pressure to reservoir 12 or the bladder containing first reactant 14. Some exemplary pressure applicators include, but are not limited to, spring, foam, piston, propellant gas, liquefied hydrocarbon, deformable flexible walls, or a combination thereof. As shown, a compressed spring 17 is pushing a movable wall 19 to apply pressure on reservoir 12.

Movable wall 19 may form a seal with the inner wall of reservoir 12. Other devices capable of generating a force and/or applying pressure known to one skilled in the art can also be used in the present invention as the pressure applicator.

Reaction chamber 18, in addition to storing second reactant 20, may also include a liquid impermeable/gas permeable member 22 that allows the generated hydrogen gas to exit reaction chamber 18, and at the same time to keep liquid reactants within reaction chamber 18. Preferably, gas permeable member 22 is connected to coupler 24c that is in communication with coupler 32c and conduit 38. Gas permeable member 22 can be made of any liquid impermeable/gas permeable material known to one skilled in the art. Such materials can include, but are not limited to, hydrophobic materials having an alkane group. More specific examples include, but are not limited to: polyethylene compositions, polytetrafluoroethylene, polypropylene, polyglactin (VICRY®), lyophilized dura mater, or a combination thereof. Gas permeable member 22 may comprise a gas permeable/liquid impermeable membrane covering a porous member. Examples of such membrane are CELGARD® and GORE-TEX®. Other gas permeable, liquid impermeable members usable in the present invention include, but are not limited to, SURBENT® Polyvinylidene Fluoride (PVDF) having a porous size of from about 0.1 µm to about 0.45 µm, available from Millipore Corporation. The pore size of SURBENT® PVDF regulates the amount of water and/or methanol exiting the system. Materials such as electronic vent type material having 0.2 µm hydro, available from W.L. Gore, can also be used in the present invention. Additionally, 0.25 inch diameter rods having a pore size of about 10 µm, 2 inch diameter discs with a thickness of about 0.3 µm, from GenPore, and sintered and/or ceramic porous material having a pore size of less than about 10 µm from Applied Porous Technologies Inc. are also usable in the present invention. Furthermore, nanograss materials, from Bell Labs, are also usable to filter the liquid. Nanograss controls the behavior of tiny liquid droplets by applying electrical charges to specially engineered silicon surfaces that resemble blades of grass. Additionally, or alternatively, the gas permeable, liquid impermeable materials disclosed in U.S. patent application Ser. No. 10/356,793 are also usable in the present invention, all of which are incorporated herein by reference in their entirety.

Receiver 30 of the present invention includes a valve or a flow control device 36 connected to conduits 34a and 34b, as shown. Flow control device 36 can be any device that allows first reactant 14 to enter reaction chamber 18 under predetermined conditions. Some examples of flow control device 36 are: a check valve, a duckbill valve, a solenoid valve, a magnetic valve, and other mechanical and electrical valves. In this embodiment, when the pressure in reaction chamber 18 and reservoir 12 are within a predetermined difference, e.g., X psi, flow control device 36 can remain closed so that no flow of first reactant 14 occurs. Hence, gas-generating apparatus 1 is in the non-operative state or "OFF" position when reaction chamber 18 is pressurized. In one example, X is about 2 psi, however, X can be any pressure. When hydrogen is needed, valve 40 opens and the pressure in reaction chamber 18 is drawn down. When the pressure in reaction chamber 18 is less than X psi from the pressure in reservoir 12, and flow control device 36 opens, first reactant 14 is transported from reservoir 12 through couplers 24a, 32a, and through conduit 34a, flow control device 36, conduit 34b, and couplers 32b, 24b to reaction chamber 18. There, first reactant 14 reacts with second reactant 20 (or heated or exposed to catalysts) to produce hydrogen. The produced hydrogen permeates through gas permeable member 22 and exits from cartridge 10 through couplers 24c, 32c, and from receiver 30 through conduit 38 and through shut-off valve 40 to a fuel cell.

Prior to the first use, reaction chamber 18 can also include an inert gas. The inert gas is pressurized, e.g., pre-loaded, to a level approaching the predetermined pressure that closes valve 36 to stop the flow of first reactant 14 from reservoir 12 into reaction chamber 18. After cartridge 10 is connected for the first time to receiver 30, the pressurized gas prevents the opening of valve 36, thereby preventing the transport of first reactant 14 to start the reaction. When production of hydrogen is required, shut-off valve 40 is opened to release the inert gas and draw down the pressure in reaction chamber 18. Hence, valve 36 opens to start the flow of first reactant 14 to produce hydrogen. Alternatively, the inert gas can be replaced by hydrogen so that the preloading gas can be consumed by the fuel cell.

When hydrogen gas is needed, shut-off valve 40 opens and gas producing apparatus 1 is in the operative or "ON" position. As the inert gas or hydrogen is transported out of reaction chamber 18, the pressure within reaction chamber 18 decreases and the pressure difference between reservoir 12 and reaction chamber 18 exceeds X psi. This difference in pressure opens flow control device 36, and first reactant 14 is pushed by spring 17 through flow control device 36 to react with second reactant 20 in reaction chamber 18. The reaction between first reactant 14 and second reactant 20 generates hydrogen gas, which is separated from the liquid inside reaction chamber 18 via gas permeable member 22. The separated hydrogen gas can then reach the fuel cell via conduit 38 and shut-off valve 40.

When the generated hydrogen gas is no longer in demand and shut-off valve 40 is closed, reaction chamber 18 re-pressurizes (since first reactant 14 and second reactant 20 continue to mix until flow control device 36 closes). Once the pressure has reached the predetermined level, flow control device 36 closes to stop the flow of first reactant 14 into reaction chamber 18. The cycle can restart again when hydrogen gas is needed.

When the rate of hydrogen production exceeds the rate of hydrogen withdrawal from the cartridge, the pressure in reaction chamber 18 gradually increases causing valve 36 to shut down to stop the transport of first reactant 14. When the rate of withdrawal catches up, the pressure in reaction chamber 18 decreases causing valve 36 to open to restart the production of hydrogen. This cycle automatically self-regulates during the life of the cartridge.

Pressure applicator 16 may be spring 17 or can include liquefied hydrocarbons, such as N-butane, isobutane, or a mixture of isobutane and propane. The liquid gas phase diagram of these materials is such that as long as some of the hydrocarbon remains in liquid form, its pressure is constant at constant temperature. In one example, the pressure within reservoir 12 is maintained at 17 psi (with N-butane, at room temperature).

In some exemplary embodiments, first reactant 14 and/or second reactant 20 can include at least one of an optional catalyst, a hydrogen-bearing fuel, an agent, wherein the agent can be a second hydrogen-bearing fuel that can react with the first hydrogen-bearing fuel in the presence or absence of the catalyst to produce a gas, and optionally an additive. Preferably, the agent reacts with the hydrogen-bearing fuel in the presence of a catalyst to generate the desired gas. Preferably, first reactant 14 in reservoir 12 or the bladder and second reactant 20 in reaction chamber 18 do not have the same composition. Moreover, hydrogen-bearing fuel and the agent are in separate chambers. More preferably, first reactant 14 includes the agent, such as water which also contains hydrogen, and second reactant 20 includes the hydrogen-bearing fuel, such as a metal borohydride or a metal hydride.

The hydrogen-bearing fuel of the present invention can be any fuel capable of producing hydrogen, when reacted with an agent/composition and/or placed under certain conditions. In some exemplary embodiments, the hydrogen-bearing fuel can include a metal hydride capable of releasing hydrogen upon contact with an agent, which can be another hydrogen-bearing fuel, such as water. The reaction between the metal hydride and water can be described as:

$$MH_x + 2H_2O \rightarrow M(OH)_4 + xH_2$$

Examples of the fuel can include, but are not limited to, hydrides of elements of Groups IA-IVA of the Periodic Table of the Elements and mixtures thereof, such as alkaline or alkali metal hydrides, or mixtures thereof. Other compounds, such as alkali metal-aluminum hydrides (alanates) and alkali metal borohydrides may also be employed. More specific examples of metal hydrides include, but are not limited to, lithium hydride, lithium aluminum hydride, lithium borohydride, sodium hydride, sodium borohydride, potassium hydride, potassium borohydride, magnesium hydride, calcium hydride, and salts and/or derivatives thereof. The preferred hydrides are sodium borohydride, magnesium borohydride, lithium borohydride, and potassium borohydride. Preferably, the hydrogen-bearing fuel comprises the solid form of $NaBH_4$ or $Mg(BH_4)_2$. In solid form, $NaBH_4$ does not hydrolyze in the absence of water and therefore improves shelf life of the cartridge. However, the aqueous form of hydrogen-bearing fuel, such as aqueous $NaBH_4$, can also be utilized in the present invention. When an aqueous form of $NaBH_4$ is utilized, the chamber containing the aqueous $NaBH_4$ also includes a stabilizer. Exemplary stabilizers can include, but are not limited to, metals and metal hydroxides, such as alkali metal hydroxides. Examples of such stabilizers are described in U.S. Pat. No. 6,683,025, which is incorporated herein by reference in its entirety. Preferably, the stabilizer is NaOH.

As stated above, the solid form of the hydrogen-bearing fuel is preferred over the liquid form. In general, solid fuels are more advantageous than liquid fuels because the liquid fuels contain proportionally less energy than the solid fuels and the liquid fuels are less stable than the counterpart solid fuels.

First reactant 14 can comprise an agent that is capable of reacting with the hydrogen-bearing fuel in the presence of an optional catalyst to generate hydrogen. The agent can be a compound or a composition that can act as a source of proton. Some exemplary sources of proton include, but are not limited to, water, alcohols, and/or dilute acids. The most common source of proton is water. As indicated above and in the formulation below, water can react with a hydrogen-bearing fuel, such as $NaBH_4$ in the presence of an optional catalyst to generate hydrogen.

$$X(BH_4)_y + 2H_2O \rightarrow X(BO)_2 + 4H_2$$

Where X includes, but is not limited to, Na, Mg, Li and all alkaline metals, and Y is an integer.

First reactant 14 can also include optional additives that reduce or increase the pH of the solution. The pH of first reactant 14 can determine the speed at which hydrogen is produced. For example, additives that reduce the pH of first reactant 14 result in a higher rate of hydrogen generation. Such additives include, but are not limited to, acids, such as acetic acid. Conversely, additives that raise the pH can lower the reaction rate to the point where almost no hydrogen evolves. The solution of the present invention can have any pH value less than 7, such as a pH of from about 1 to about 6 and, preferably, from about 3 to about 5.

In some exemplary embodiments, the first reactant, the second reactant, or both can include a catalyst that can initiate and/or facilitate the production of hydrogen gas by increasing the rate at which first reactant 14 reacts with second reactant 20. The catalyst of the present invention can include any shape or size that is capable of promoting the desired reaction. For example, the catalyst can be small enough to form a powder or it can be as large as reservoir 12 or reaction chamber 18. In some exemplary embodiments, the catalyst is a catalyst bed. The catalyst can be located inside reservoir 12 or the bladder (if any), reaction chamber 18, proximate to reservoir 12, and/or proximate to reaction chamber 18, as long as at least one of either first reactant 14 or second reactant 20 can come into contact with the catalyst.

The catalyst of the present invention can include one or more transitional metals from Group VIIIB of the Periodic Table of the Elements. For example, the catalyst can include transitional metals such as iron (Fe), cobalt (Co), nickel (Ni), ruthenium (Ru), rhodium (Rh), platinum (Pt), palladium (Pd), osmium (Os), iridium (Ir). Additionally, transitional metals in Group IB, i.e., copper (Cu), silver (Ag), and gold (Au), and in Group IIB, i.e., zinc (Zn), cadmium (Cd), and mercury (Hg), can also be used in the catalyst of the present invention. Other transitional metals that can be used as part of a catalyst include, but are not limited to, scandium (Sc), titanium (Ti), vanadium (V), chromium (Cr), and manganese (Mn). Transition metal catalysts useful in the catalyst systems of the present invention are described in U.S. Pat. No. 5,804,329, which is incorporated herein by reference in its entirety. The preferred catalyst of the present invention is $CoCl_2$.

Some of the catalysts of the present invention can generically be defined by the following formula:

$$M_a X_b$$

wherein M is the cation of the transition metal, X is the anion, and "a" and "b" are integers from 1 to 6 that are needed to balance the charges of the transition metal complex.

Suitable cations of the transitional metals include, but are not limited to, iron (II) ($Fe^{2+}$), iron (III) ($Fe^{3+}$), cobalt ($Co^{2+}$), nickel (II) ($Ni^{2+}$), nickel (III) ($Ni^{3+}$), ruthenium (III) ($Ru^{3+}$), ruthenium (IV) ($Ru^{4+}$), ruthenium (V) ($Ru^{5+}$), ruthenium (VI) ($Ru^{6+}$), ruthenium (VIII) ($Ru^{8+}$), rhodium (III) ($Rh^{3+}$), rhodium (IV) ($Rh^{4+}$), rhodium (VI) ($Rh^{6+}$), palladium ($Pd^{2+}$), osmium (III) ($Os^{3+}$), osmium (IV) ($Os^{4+}$), osmium (V) ($Os^{5+}$), osmium (VI) ($Os^{6+}$), osmium (VIII) ($Os^{8+}$), iridium (III) ($Ir^{3+}$), iridium (IV) ($Ir^{4+}$), iridium (VI) ($Ir^{6+}$), platinum (II) ($Pt^{2+}$), platinum (III) ($Pt^{3+}$), platinum (IV) ($Pt^{4+}$), platinum (VI) ($Pt^{6+}$), copper (I) ($Cu^+$), copper (II) ($Cu^{2+}$), silver (I) ($Ag^+$), silver (II) ($Ag^{2+}$), gold (I) ($Au^+$), gold (III) ($Au^{3+}$), zinc ($Zn^{2+}$), cadmium ($Cd^{2+}$), mercury (I) ($Hg^+$), mercury (II) ($Hg^{2+}$), and the like.

Suitable anions include, but are not limited to, hydride ($H^-$), fluoride ($F^-$), chloride ($Cl^-$), bromide ($Br^-$), iodide ($I^-$), oxide ($O^{2-}$), sulfide ($S^{2-}$), nitride ($N^{3-}$), phosphide ($P^{4-}$), hypochlorite ($ClO^-$), chlorite ($ClO_2^-$), chlorate ($ClO_3^-$), perchlorate ($ClO_4^-$), sulfite ($SO_3^{2-}$), sulfate ($SO_4^{2-}$), hydrogen sulfate ($HSO_4^-$), hydroxide ($OH^-$), cyanide ($CN^-$), thiocyanate ($SCN^-$), cyanate ($OCN^-$), peroxide ($O_2^{2-}$), manganate ($MnO_4^{2-}$), permanganate ($MnO_4^-$), dichromate ($Cr_2O_7^{2-}$), carbonate ($CO_3^{2-}$), hydrogen carbonate ($HCO_3^-$), phosphate ($PO_4^{2-}$), hydrogen phosphate ($HPO_{4-}$), dihydrogen phosphate ($H_2PO_{4-}$), aluminate ($Al_2O_4^{2-}$), arsenate ($AsO_4^{3-}$), nitrate ($NO_3^-$), acetate ($CH_3COO^-$), oxalate ($C_2O_4^{2-}$), and the like. A preferred catalyst is cobalt chloride.

In some exemplary embodiments, the optional additive, which can be in reservoir 12 and/or in reaction chamber 18, can be any composition that is capable of substantially preventing the freezing of or reducing the freezing point of first reactant 14 and/or second reactant 20. In some exemplary embodiments, the additive can be an alcohol-based composition, such as an anti-freezing agent. Preferably, the additive of the present invention is $CH_3OH$. However, as stated above, any additive capable of reducing the freezing point of first reactant 12 and/or second reactant 20 can be used.

Preferably, the fuel for a hydrogen-generating system of the present invention includes a solid metal hydride, and an aqueous solution having water, a catalyst, such as $CoCl_2$, and an alcohol, such as $CH_3OH$. More preferably, the aqueous solution optionally includes an acid having a pH of from about 3 to 5. An example of an acid that is added to the aqueous solution is acetic acid. One purpose of the acid in the present invention is to allow a more constant reaction between the aqueous solution and the solid fuel by preventing the formation of a barrier at the entrance of reaction chamber 12.

In the above described embodiment, the pressurization of reaction chamber 18 caused by the production of hydrogen, when demand for hydrogen is ceased, closes flow control device 36 to stop the transport of first reactant 14 in reservoir 12, which in turn stops the reaction that produces more hydrogen.

Some exemplary formulations of the present invention are summarized in Table I.

TABLE I

Formulation of Reactants inside Cartridge

| 10 Watt-Hour Cartridges | | Weight (%) | Volume (%) |
| --- | --- | --- | --- |
| Example 1 | $NaBH_4$ | 47.36 | 48.09 |
| | $CoCl_2$* | 2.09 | 1.06 |
| | $CH_3OH$ | 6.28 | 7.72 |
| | $H_2O$ | 44.27 | 43.12 |

* $CoCl_2$ is in a 6 molar water solution.

Based on the above exemplary formulation, suitable fuels may contain solid metal hydride in an amount of from about 42 to about 52 weight percentage, water in an amount of from about 40 to about 50 weight percentage, catalyst in an amount of from about 0.1 to about 4 weight percentage, and alcohol is in an amount of from about 1 to about 10 weight percentage. Expressed differently, suitable fuels may contain solid metal hydride in an amount of from about 43 to about 53 volume percentage, water in an amount of from about 39 to about 49 volume percentage, catalyst in an amount of from about 0.1 to about 3 volume percentage, and alcohol in an amount of from about 3 to about 11 volume percentage.

The exemplary fuel exhibits improved hydrogen storage of up to about 9 percent by weight or more.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

We claim:

1. A gas-generating apparatus comprising a reaction chamber, where a hydrogen gas is produced from a reaction between a metal hydride and a liquid reactant, and a hydrogen separating member disposed within the reaction chamber and connected to a coupler of the reaction chamber,
   wherein the hydrogen separating member comprises a gas permeable, liquid impermeable membrane covering a porous member, wherein the porous member is connected to the coupler and wherein the hydrogen gas permeates through the hydrogen separating member through the porous member and to the coupler.

2. The gas-generating apparatus of claim 1, wherein the gas permeable, liquid impermeable membrane comprises at least a hydrophobic material having an alkane group.

3. The gas-generating apparatus of claim 2, wherein the hydrophobic material having the alkane group comprises at least one of polyethylene, polytetrafluoroethylene, polypropylene, polyglactin, lyophilized dura mater, polyvinylidene fluoride (PVDF) having a pore size from about 0.1 µm to about 0.45 µm, or a combination thereof.

4. The gas-generating apparatus of claim 2, wherein the hydrophobic material having the alkane group is selected from a group consisting of polyethylene, polytetrafluoroethylene, polypropylene, polyglactin, lyophilized dura mater, polyvinylidene fluoride (PVDF) having a pore size from about 0.1 µm to about 0.45 µm, and a combination thereof.

5. The gas-generating apparatus of claim 1, wherein the reaction between the metal hydride and the liquid reactant occurs substantially outside of the hydrogen separating member.

6. The gas-generating apparatus of claim 1, wherein the porous member has a pore size of less than about 10 µm.

7. The gas-generating apparatus of claim 6, wherein the porous member comprises a sintered or ceramic material.

8. The gas-generating apparatus of claim 6, wherein the reaction between the metal hydride and the liquid reactant occurs substantially outside of the hydrogen separating member.

9. The gas-generating apparatus of claim 6, wherein the porous member comprises a rod.

10. The gas-generating apparatus of claim 1, wherein the the coupler is connected within the reaction chamber to the hydrogen separating member.

11. A method for separating hydrogen comprising the steps of
   (i) reacting a metal hydride with a liquid reactant to produce hydrogen,
   (ii) providing a hydrogen separating member having a gas permeable, liquid impermeable membrane covering a porous member, wherein the porous member is connected to a coupler of a reaction chamber, wherein said reaction occurs substantially outside of the hydrogen separating member, and
   (iii) transporting the hydrogen through the hydrogen separating member through the porous member and to the coupler.

12. The method of claim 11, wherein in step (i) the reaction occurs in the reaction chamber.

13. The method of claim 12, wherein the reaction chamber is a part of a cartridge.

14. The method of claim 11, further comprising the step of:
   (iv) exiting the hydrogen gas from the reaction chamber through the coupler connected within the reaction chamber to the hydrogen separating member.

15. A gas-generating apparatus comprising a reaction chamber, where a hydrogen gas is produced from a reaction between a metal hydride and a liquid reactant, and a hydrogen separating member disposed within the reaction chamber and fluidically connected to an outlet of the gas-generating apparatus, wherein the hydrogen separating member comprises a gas permeable, liquid impermeable membrane covering a porous member, and wherein the hydrogen gas permeates through the hydrogen separating member to the outlet, wherein the hydrogen separating member comprises a nanograss material.

16. A gas-generating apparatus comprising a reaction chamber, where a hydrogen gas is produced from a reaction between a metal hydride and a liquid reactant, and a hydrogen separating member disposed within the reaction chamber and fluidically connected to an outlet of the gas-generating apparatus,
  wherein the hydrogen separating member comprises a porous member having a pore size of less than about 10 µm, and wherein the hydrogen gas permeates through the hydrogen separating member to the outlet, and wherein the hydrogen material comprises a nanograss material.

* * * * *